United States Patent
Nakhjiri et al.

(10) Patent No.: US 10,547,197 B2
(45) Date of Patent: Jan. 28, 2020

(54) FOLDABLE WIRELESS CHARGER MODULE

(71) Applicant: Flextronics AP, LLC, San Jose, CA (US)

(72) Inventors: Mahsa Nakhjiri, Los Gatos, CA (US); Paul J. Yarka, Los Gatos, CA (US); Zixiao Pan, Fremont, CA (US); Jordan Pine, San Jose, CA (US); David Bradley, Scotts Valley, CA (US)

(73) Assignee: Flextronics AP, LLC, San Jose, CA (US)

( * ) Notice: Subject to any disclaimer, the term of this patent is extended or adjusted under 35 U.S.C. 154(b) by 132 days.

(21) Appl. No.: 15/332,748

(22) Filed: Oct. 24, 2016

(65) Prior Publication Data
US 2017/0117742 A1 Apr. 27, 2017

Related U.S. Application Data

(60) Provisional application No. 62/245,519, filed on Oct. 23, 2015.

(51) Int. Cl.
*H02J 7/00* (2006.01)
*H02J 7/02* (2016.01)

(52) U.S. Cl.
CPC ............ *H02J 7/025* (2013.01); *H02J 7/0044* (2013.01); *H02J 7/027* (2013.01)

(58) Field of Classification Search
CPC ........ H02J 7/025; H02J 7/0042; H02J 7/0044; H02J 7/027; H02J 50/10
USPC ........................................................ 320/108
See application file for complete search history.

(56) References Cited

U.S. PATENT DOCUMENTS

| | | | | |
|---|---|---|---|---|
| 8,395,353 B2* | 3/2013 | Wang | ..................... | H02J 7/0042 320/108 |
| 8,907,752 B2* | 12/2014 | Wodrich | ............... | G06F 1/1635 335/219 |
| 10,199,851 B2* | 2/2019 | Hiroki | ..................... | H02J 7/025 |
| 2011/0018360 A1* | 1/2011 | Baarman | ............... | H02J 7/0027 307/104 |
| 2011/0227527 A1* | 9/2011 | Zhu | ....................... | H02J 7/0044 320/108 |
| 2011/0260681 A1* | 10/2011 | Guccione | .............. | H02J 7/0054 320/108 |

(Continued)

*Primary Examiner* — Nathaniel R Pelton
*Assistant Examiner* — Manuel Hernandez
(74) *Attorney, Agent, or Firm* — Sheridan Ross P.C.

(57) ABSTRACT

In one embodiment, the wireless charger can be light-weight, thin, and can be hidden and/or integrated inside of handbags, backpacks, jackets, and other accessories. The wireless charger can also be used as a standalone product. The wireless charger charges phones using wireless power transmission and incorporates a battery which can be recharged through a power adapter. When properly integrated, the wireless charger according to embodiments described herein can be integrated into such apparel, accessories, or other products without altering or affecting the appearance of the product. For example, the wireless charger may be seamlessly incorporated into most any apparel and accessories from purses to apparel to jackets if the product has a pocket. Because various aspects of the wireless charger are adaptable, it can be easily customized to meet customer needs.

6 Claims, 12 Drawing Sheets

(56) References Cited

U.S. PATENT DOCUMENTS

| | | | | |
|---|---|---|---|---|
| 2013/0099730 | A1* | 4/2013 | Yoon | H05K 1/165 |
| | | | | 320/108 |
| 2014/0002010 | A1* | 1/2014 | Paczkowski | H02J 7/0042 |
| | | | | 320/107 |
| 2014/0132205 | A1* | 5/2014 | Paczkowski | H02J 7/0045 |
| | | | | 320/107 |
| 2014/0210405 | A1* | 7/2014 | Yang | H02J 7/0044 |
| | | | | 320/108 |
| 2014/0253024 | A1* | 9/2014 | Rautiainen | H02J 7/025 |
| | | | | 320/108 |
| 2014/0308995 | A1* | 10/2014 | Wu | H02J 7/007 |
| | | | | 455/573 |
| 2015/0130403 | A1* | 5/2015 | Malladi | H02J 7/0042 |
| | | | | 320/107 |
| 2015/0295437 | A1* | 10/2015 | Wang | H02J 7/0044 |
| | | | | 455/573 |
| 2016/0105050 | A1* | 4/2016 | Chan | H02J 7/0044 |
| | | | | 320/114 |
| 2019/0214835 | A1* | 7/2019 | Jabori | H02J 7/0027 |

* cited by examiner

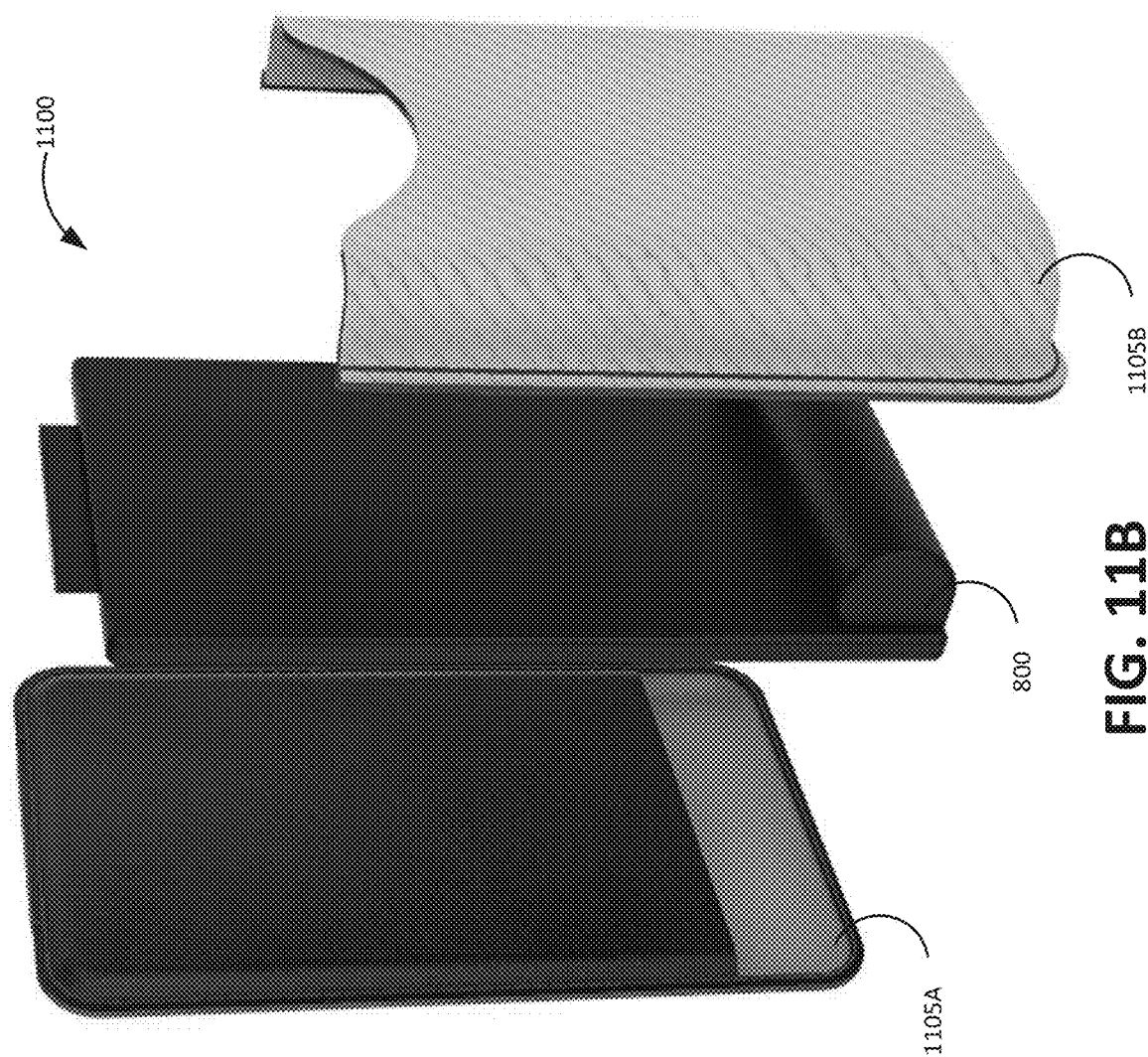
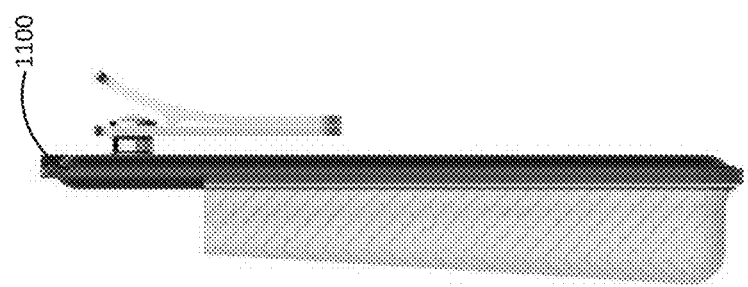
FIG. 11B
FIG. 11A

FOLDABLE WIRELESS CHARGER MODULE

CROSS REFERENCE TO RELATED APPLICATION

The present application claims the benefits of and priority, under 35 U.S.C. § 119(e), to U.S. Provisional Application No. 62/245,519 filed Oct. 23, 2015 by Nakhjiri et. al. and entitled "Wireless Charger Module" of which the entire disclosure is incorporated herein by reference for all purposes.

FIELD OF THE DISCLOSURE

Embodiments of the present disclosure relate generally to methods and systems for wireless charging of devices and more particularly to a portable and adaptable wireless charger.

BACKGROUND

Portable electronic devices such as cell phones, smartphones, tablets, Personal Digital Assistants (PDAs), media players, etc. rely on battery power for normal operation. Typically, a user charges the device before expected use by connecting the device to a battery charger or charging station and the battery of the device, once fully charged, provides enough capacity for a normal amount of use of the device. Many chargers or charging stations connect directly to the device through an electrical connector that mates with a connector on or in the device. Other chargers connect indirectly to the device using induction. Inductive charging (also known as wireless charging) uses an electromagnetic field to transfer energy between the charger and the device through electromagnetic induction. More specifically, induction chargers use an induction coil to create an alternating electromagnetic field from within a charging base, and a second induction coil in the device takes power from the electromagnetic field and converts it back into electric current to charge the battery of the device or to power the device in operation. While convenient, existing wireless chargers are typically specialized and not adaptable between difference types of devices and in different implementations. Additionally, wireless chargers are frequently bulky and relatively inconvenient for users to transport between locations or to carry along with them for use as needed. Hence, there is a need for improved wireless chargers that are more portable and adaptable.

BRIEF SUMMARY

Embodiments of the disclosure provide a portable and adaptable wireless charger. The wireless charger described herein can comprise a customizable platform such as a smartphone wireless charger that can be adapted and integrated to several product categories. The adaptable aspects of the various embodiments of the disclosed wireless charger can include, but are not limited to, aesthetics, dimensions, and technical specifications.

In one embodiment, the wireless charger can be lightweight, thin (approximately 6.5 mm thick), and can be hidden and integrated inside of handbags, backpacks, jackets, and other accessories. When properly integrated, the wireless charger according to embodiments described herein can be integrated into such apparel, accessories, or other products without altering or affecting the appearance of the product. For example, the wireless charger may be seamlessly incorporated into most any apparel or accessories from purses to jackets if the product has a pocket. Because various aspects of the wireless charger are adaptable, it can be easily customized if it currently does not meet customer needs.

According to one embodiment, the wireless charger can comprise a plug-and-play charging feature. That is, the wireless charger may be plugged into a wall outlet via the wall outlet charging adapter, such that both the smartphone and batteries within the wireless charger can be charged simultaneously. It can support wireless charging of a wide variety of the latest mobile phones including, but not limited to, the iPhone 6, iPhone 6S, iPhone 7, Samsung Galaxy S6, Samsung Galaxy S6 Edge, Samsung Galaxy S7, Samsung Galaxy S7 Edge, and others. In some cases, e.g., the iPhone 6, iPhone 6S, or iPhone 7, a phone case with a receiver coil for wirelessly charging may be utilized with the wireless charger described herein.

In some embodiments, the wireless charger can comprise any one or more of the following features: high capacity, rechargeable lithium batteries with hard shell; interconnects via flex circuit to accommodate flexibility; a power console to communicate intuitively with users regarding charging status; an on/off switch with users being in full control of wirelessly charging their mobile phone; a transmitter coil to accommodate Qi standard compliant charging; a microcontroller with adaptive charging algorithms to intelligently charge a mobile phone based on proprietary sensor measurements; a temperature sensor; and/or a current limit sensor.

BRIEF DESCRIPTION OF THE DRAWINGS

FIG. 11A is a diagram illustrating a view of an accessory product in which a wireless charger according to the alternative embodiment can be integrated.

FIG. 11B is a diagram illustrating the manner of integration of the wireless charger according to the alternative embodiment into the accessory product.

Figure 1:
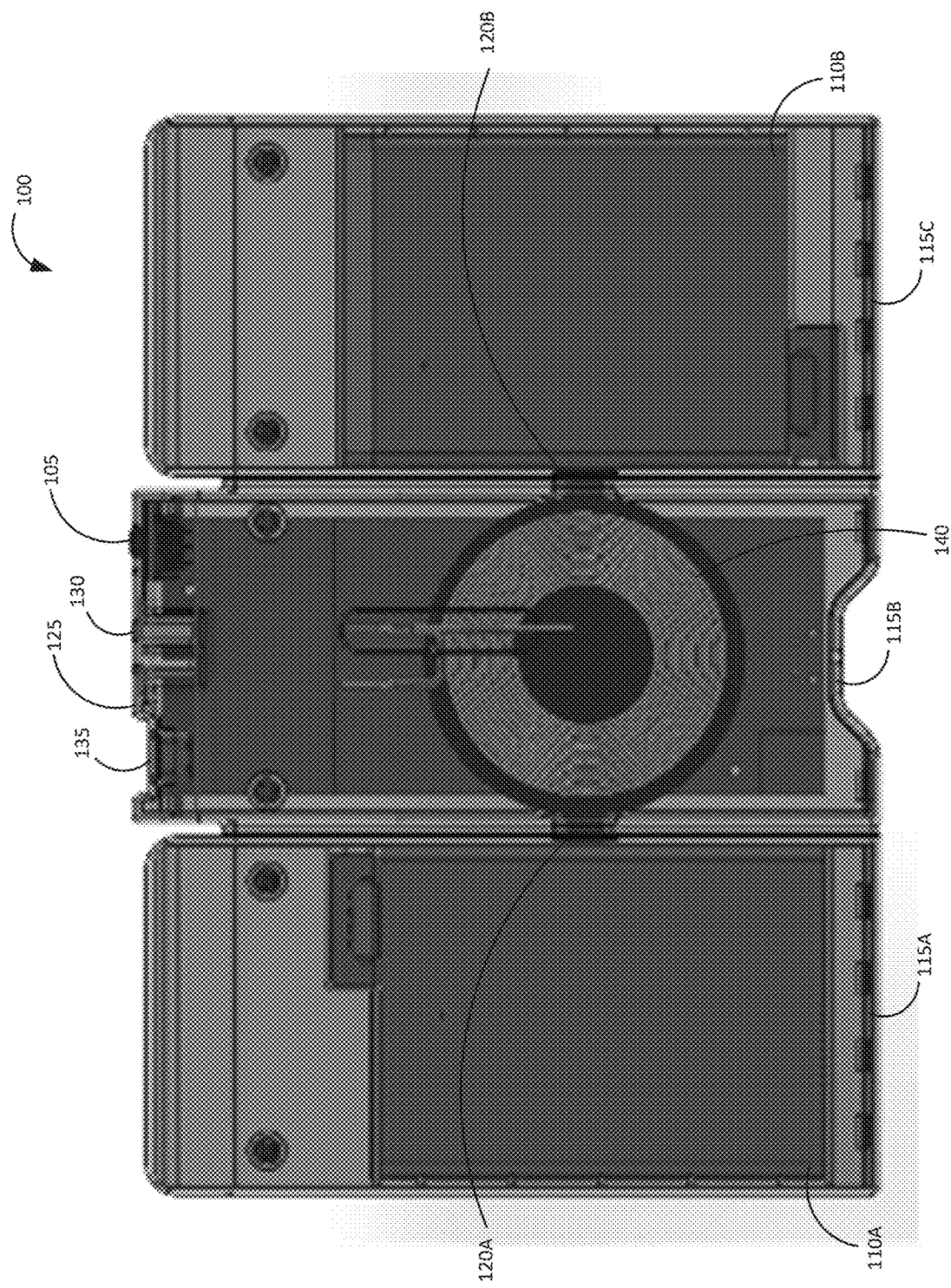
FIG. 1 is a diagram illustrating a view of an exemplary wireless charger showing the major structure according to one embodiment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide a portable and adaptable wireless charger. The wireless charger described herein can comprise a customizable platform such as a smartphone wireless charger that can be adapted and integrated to several product categories. The adaptable aspects of the various embodiments of the disclosed wireless charger can include, but are not limited to, aesthetics, dimensions, and technical specifications. According to one embodiment, the wireless charger can comprise a plug and play charging feature. That is, the wireless charger may be plugged into a wall outlet via the wall outlet charging adapter, such that both the smartphone and batteries within the wireless charger can be charged simultaneously. It can support wireless charging of a wide variety of the latest mobile phones including, but not limited to, the iPhone 6, iPhone 6S, iPhone 7, Samsung Galaxy S6, Samsung Galaxy S6 Edge, Samsung Galaxy S7, Samsung Galaxy S7 Edge, and others. In some cases, e.g., the iPhone 6, iPhone 6S, or the iPhone 7, a phone case with a receiver coil for wirelessly charging may be utilized with the wireless charger described herein. Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a diagram illustrating a view of an exemplary wireless charger according to one embodiment. According to one embodiment, the wireless charger 100 can be plugged into a wall outlet via a wall outlet charging adapter (not shown here) connected with an input power connector 135 to charge high capacity, rechargeable lithium ion or lithium polymer batteries 110A and 110B within the wireless charger 100. A hard shell or case 115A-C can enclose and/or secure the batteries 110A and 110B and other components of the wireless charger 100. According to one embodiment, while the hard shell or case 115A-C can be fairly rigid to provide supporting structure to the wireless charger 100 and protection from physical impact to the components therein, it can also have portions that provide at least some flexibility. For example, and as illustrated here, portions of the hard shell or case 115A and 115C containing or enclosing the batteries 110A and 110B can be flexed or pivoted relative to a portion of the hard shell or case 115B containing or enclosing other components of the wireless charger 100. To accommodate this flexibility the batteries 110A and 110B and other electrical components which will be described in greater detail below can interconnect via flex circuits 120A and 120B.

The other components of the wireless charger 100 can comprise a power console 125 visible and accessible on the outside of the hard shell or case 115B. This console 125 can include, for example, indicator 130 which can comprise single or multi-color LEDs to communicate charging status to the user. The console 125 can also include an on/off switch 105 to allow users to control the wirelessly charging of their mobile phone or other device. As can be seen in this example, the wireless charger can also comprise an induction coil or transmitter coil 140 to provide Qi standard compliant wireless charging when inductively coupled with a receiver coil of the phone or device. While not visible in this view, other components of the wireless charger 100 can comprise a micro-controller with adaptive charging algorithms to intelligently charge the batteries 110A and 110B of the wireless charger 100 when power is applied through the input power connector 135 as well as to control charging of a mobile phone through the transmitter coil 140, one or more temperature sensors; and/or a current limit sensor.

Figure 2:
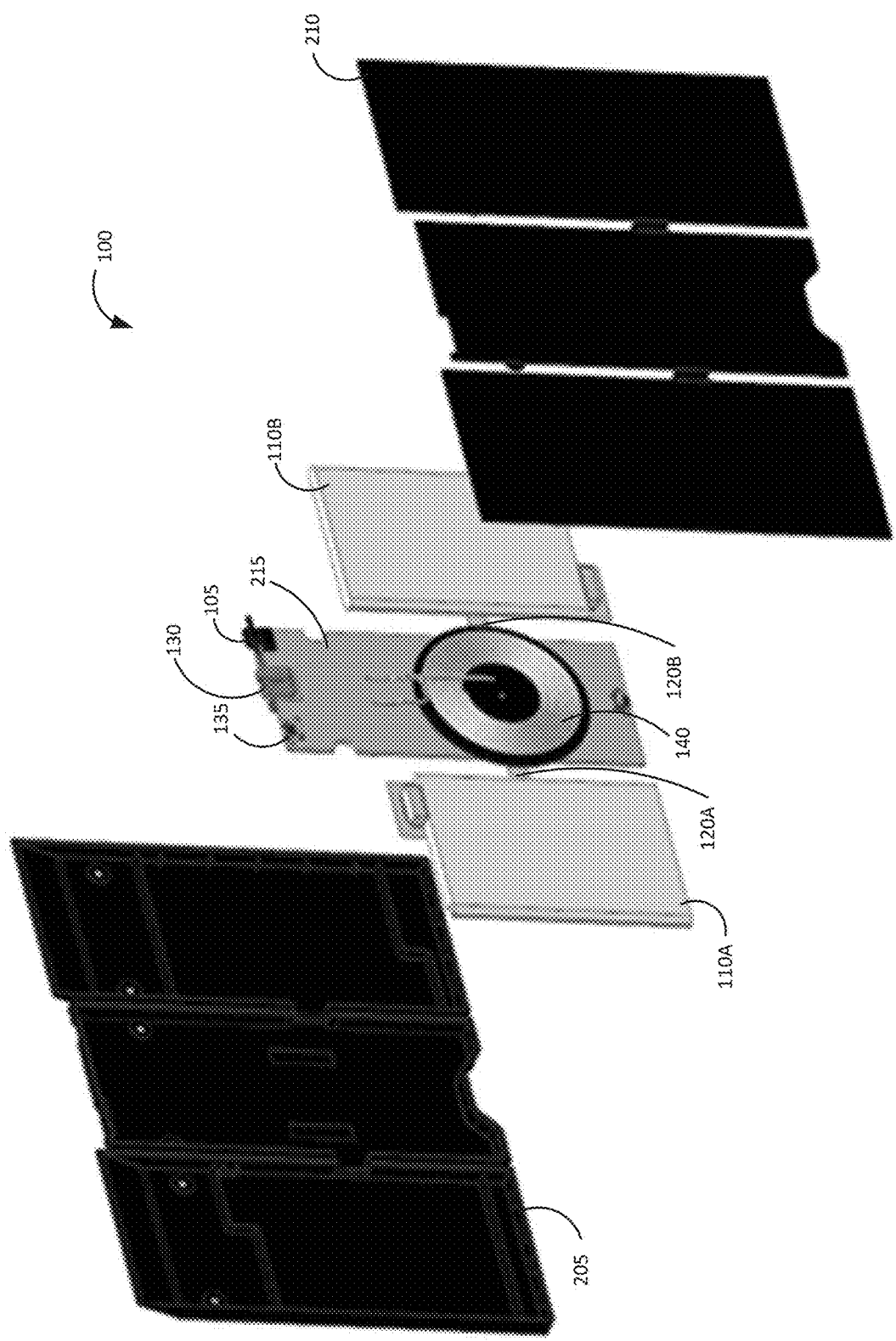
FIG. 2 is a diagram illustrating an exploded view of an exemplary wireless charger according to one embodiment.

FIG. 2 is a diagram illustrating an exploded view of an exemplary wireless charger according to one embodiment. As illustrated in this example, the hard shell or case 110A-C described above is shown as comprising two halves 205 and 210. Located between these two halves 205 and 210 of the hard shell or case are the other various components introduced above. Namely, as can be seen in this example, the charger comprises the high capacity, rechargeable lithium ion or lithium polymer batteries 110A and 110B. A main board 215 can be seen here and can be used to mount and connect the various components such as the transmitter coil 140, on/off switch 130, indicators 130, input power connector 135, and other components not visible in this view such as the micro-controller, one or more temperature sensors; and/or a current limit sensor. Also visible in this view are flex circuits 120A and 120B providing electrical connection between the batteries 110A and 110B and the main board 215 and components mounted thereon. These flex circuits 120A and 120B, together with flexible portions of the hard shell or case 110A-C as described above allow the wireless charger 100 to be at least somewhat flexible and therefore adaptable to various implementations and uses as will be described further below.

Figure 3:
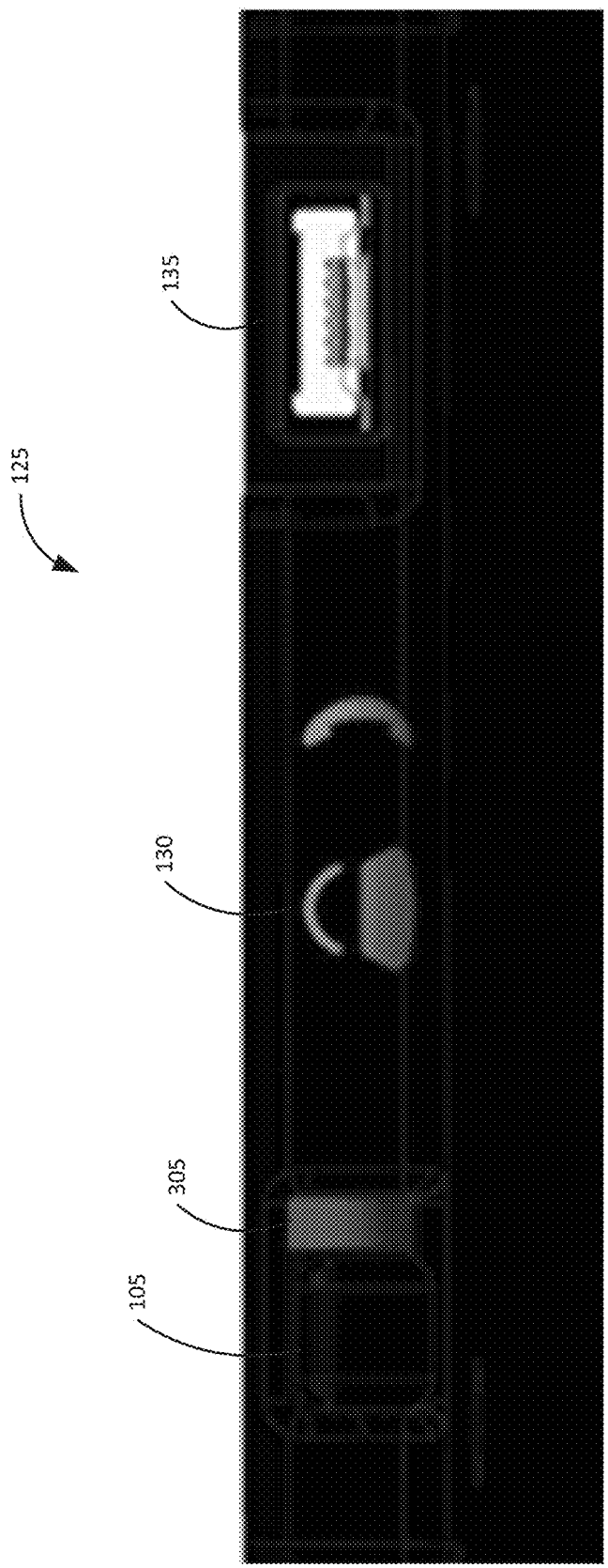
FIG. 3 is a diagram illustrating a view of the power console on an exemplary wireless charger according to one embodiment.

FIG. 3 is a diagram illustrating another view of an exemplary wireless charger according to one embodiment. More specifically, this view illustrates additional details of an exemplary console 125 as introduced above. As can be seen here, the console 125 can comprise an on/off switch 105, one or more indicators 130 which can comprise single or multi-color LEDs controlled by the micro-controller and lighted to indicate a phone charging status to the user, e.g., lighted to indicate that the phone is currently charging, fully charged, etc. Also visible in this view is the input power connector 135 which can comprise, for example, a Universal Serial Bus (USB) connector, mini-USB connector, or other known connector type through which the wireless charger can be connected with a wall outlet charging adapter or power supply to charge the battery of the wireless charger. Also shown here is a power indicator 305 such as a single or multi-color LED that can be lit to indicate a current power state, e.g., battery at minimum charge, input power on, batteries charging, batteries fully charged, etc. It should be understood that the console 125 illustrated and described here is offered for illustrative purposes only and is not intended to limit the scope of the present invention. Rather, depending upon the exact implementation, the elements and arrangement of the console can vary significantly with more or fewer elements, elements of different types, different positions and/or appearance of those elements, etc. Any such variations are contemplated and considered to be within the scope of the present disclosure.

Figure 4:
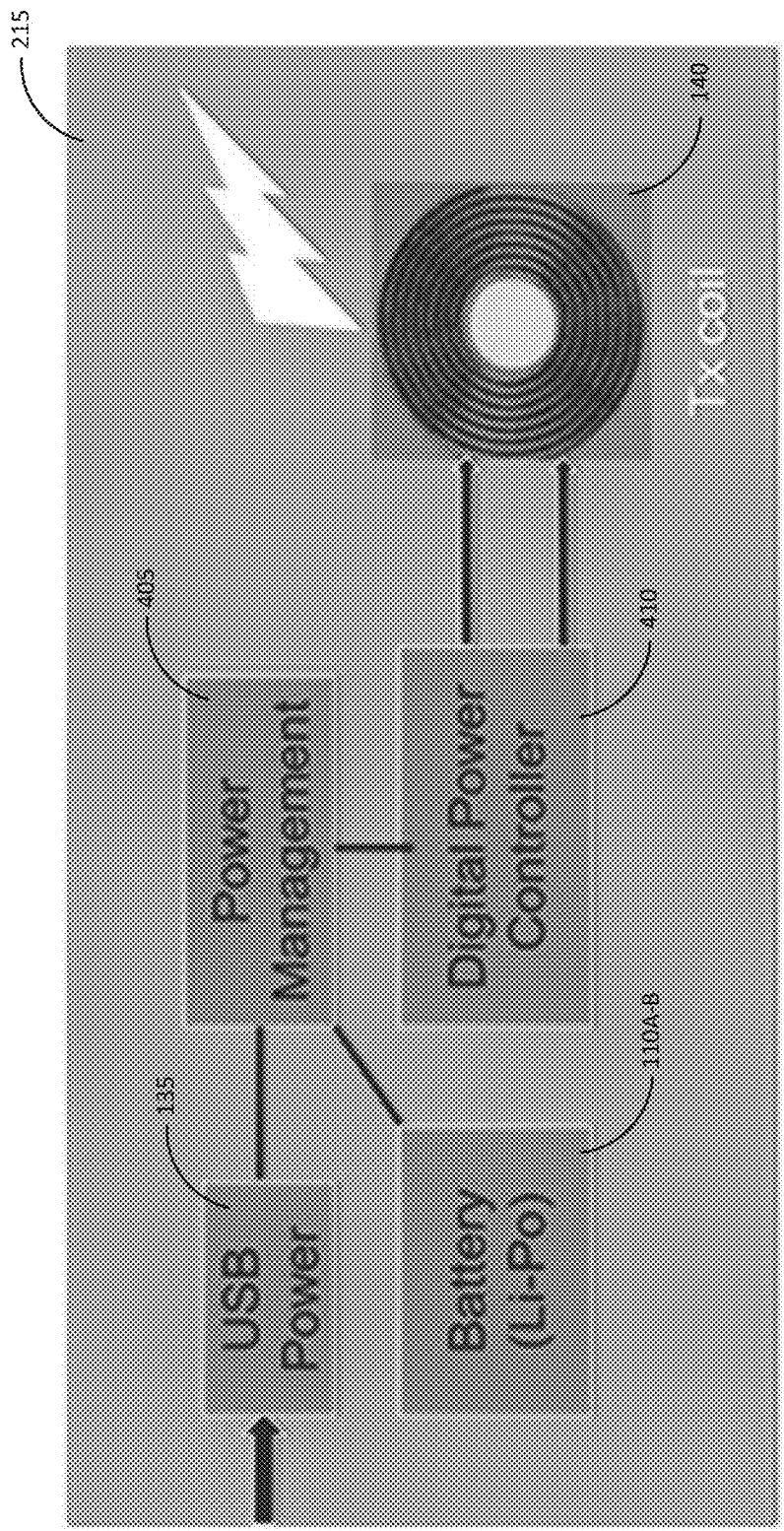
FIG. 4 is a block diagram illustrating components of an energy transmitter of a wireless charger according to one embodiment.

FIG. 4 is a block diagram illustrating components of an energy transmitter of a wireless charger according to one embodiment. More specifically, this example illustrates some of the components of the wireless charger 100 mentioned above that may be included within the hard shell or case 115A-C and mounted, for example, on the main board 215 of the wireless charger 100. As illustrated here and as introduced above, the main board 215 can have mounted thereon a USB or other power input 135 used to provide power to the wireless charger 100 for charging the batteries 110A-B and possibly powering the phone or other device. To accomplish this, the main board 215 can have mounted thereon a power management component 405. Generally speaking, the power management component 405 can comprise electronic components for conditioning and controlling the voltage and current applied to charge the batteries 110A-B. Additionally, the power management component 405 can condition and control the voltage and current provided to a digital power controller component 410. According to one embodiment, the power management component 405 may supply power to both the batteries 110A-B and power controller component 410 at the same time. The digital power controller component 410 can comprise electronic components to drive the transmission coil 140 in a manner, e.g., power level, frequency, etc., appropriate to charge the phone or device to which the wireless charger is inductively coupled. Additional details of these components and their functions will be described below.

Figure 5:
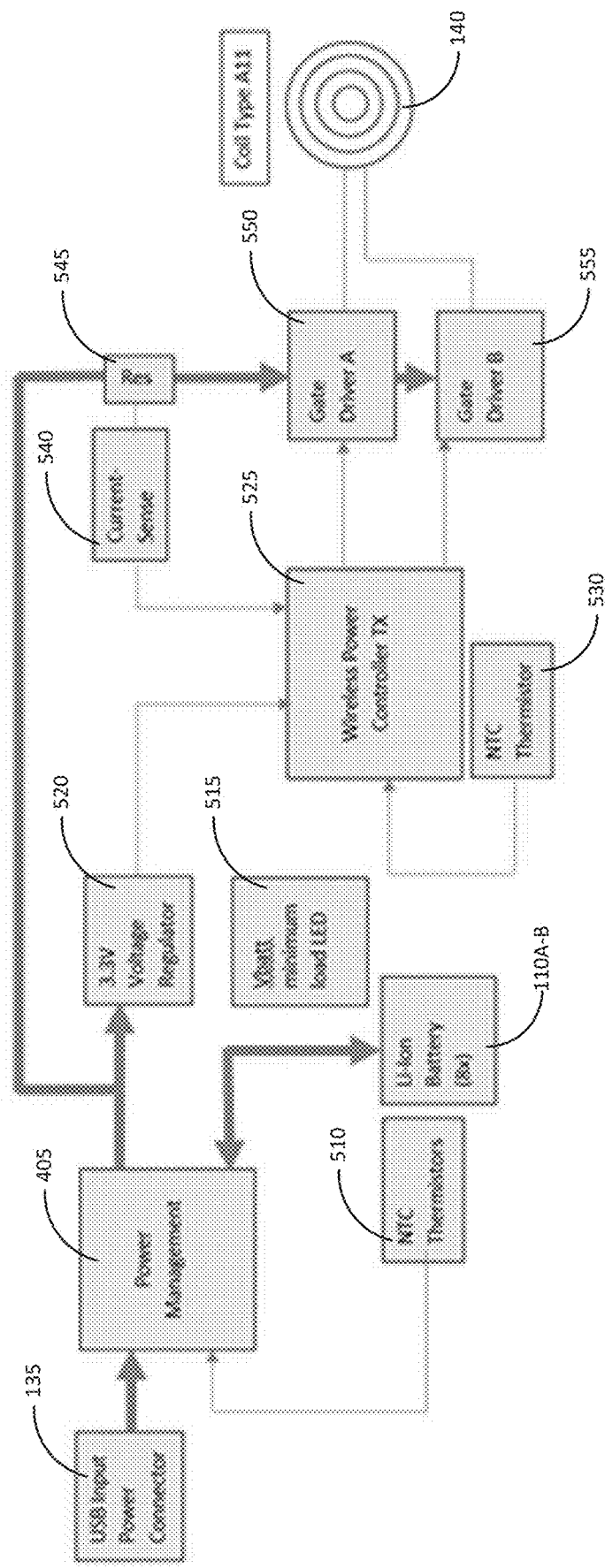
FIG. 5 is a block diagram illustrating additional details of components of a power transmitter of a wireless charger according to one embodiment.

FIG. 5 is a block diagram illustrating additional details of components of a power transmitter of a wireless charger according to one embodiment. As introduced above, the main board 215 can have mounted thereon a USB or other power input 135 used to provide power to the power management component 405. Generally speaking, the power management component 405 can comprise electronic components for conditioning and controlling the voltage and current applied to charge the batteries 110A-B. One or more thermistors 510 can also be mounted on the main board 215 or elsewhere in the hard shell or case of the wireless charger 100. As can be understood by one skilled in the art, the thermistors 510 can provide an indication of a current operating temperature of the wireless charger 100 which can be used by the power management component 405 to reduce power output or even turn off the wireless charger in case of an over-temperature condition and to prevent damage to the components of the wireless charger 100. One or more LEDs 515 can be connected with the batteries 110A-B to indicate, for example, a minimum load or charge condition.

Additionally, the power management component 405 can provide power to drive the transmission coil 140 as described above. As illustrated here, the power management component 405 can provide power to a wireless power controller 525. In some cases, the power provided to the wireless power controller 525 may first pass through a voltage regulator 520 that can control the voltage from the power management component 405 to a particular level suitable for the wireless power controller 525 e.g., 3.3 volts. This may be the case when the power management component provides a different, e.g., higher, voltage to charge the batteries 110A-B than is used by the wireless power controller 525.

One or more thermistors 530 can also be mounted on the main board 215 or elsewhere in the hard shell or case of the wireless charger 100. As can be understood by one skilled in the art, the thermistors 530 can provide an indication of a current operating temperature of the wireless charger 100 which can be used by the digital power controller 525 to reduce power output or even turn off the transmission coil in case of an over-temperature condition and to prevent damage to the components of the wireless charger 100. Additionally or alternatively, one or more current sensors 540 and appropriate resistors 545 as may be needed for operation of the current sensors 540 and as can be understood by one skilled in the art can be mounted on the main board 215 or elsewhere in the hard shell or case of the wireless charger 100. The current sensors 540 can be used by the wireless power controller 525 to detect a current load of the transmission coil 140. Based on this detected load, the wireless power controller may increase, decrease, or turn off output to the transmission coil 140.

To drive the transmission coil in a manner to create an inductive field for coupling with the phone or other device, one or more gate drivers 550 and 555 can be included in the wireless charger 100. Generally speaking, power from the power management component 405 can be applied to the gate drivers 550 and 555 which can be switched by the wireless power controller 525 to turn the transmission coil 140 on and off rapidly, thereby creating an inductive effect on a receiver coil of the phone or device when it is placed near to the transmission coil 140.

Figure 6:
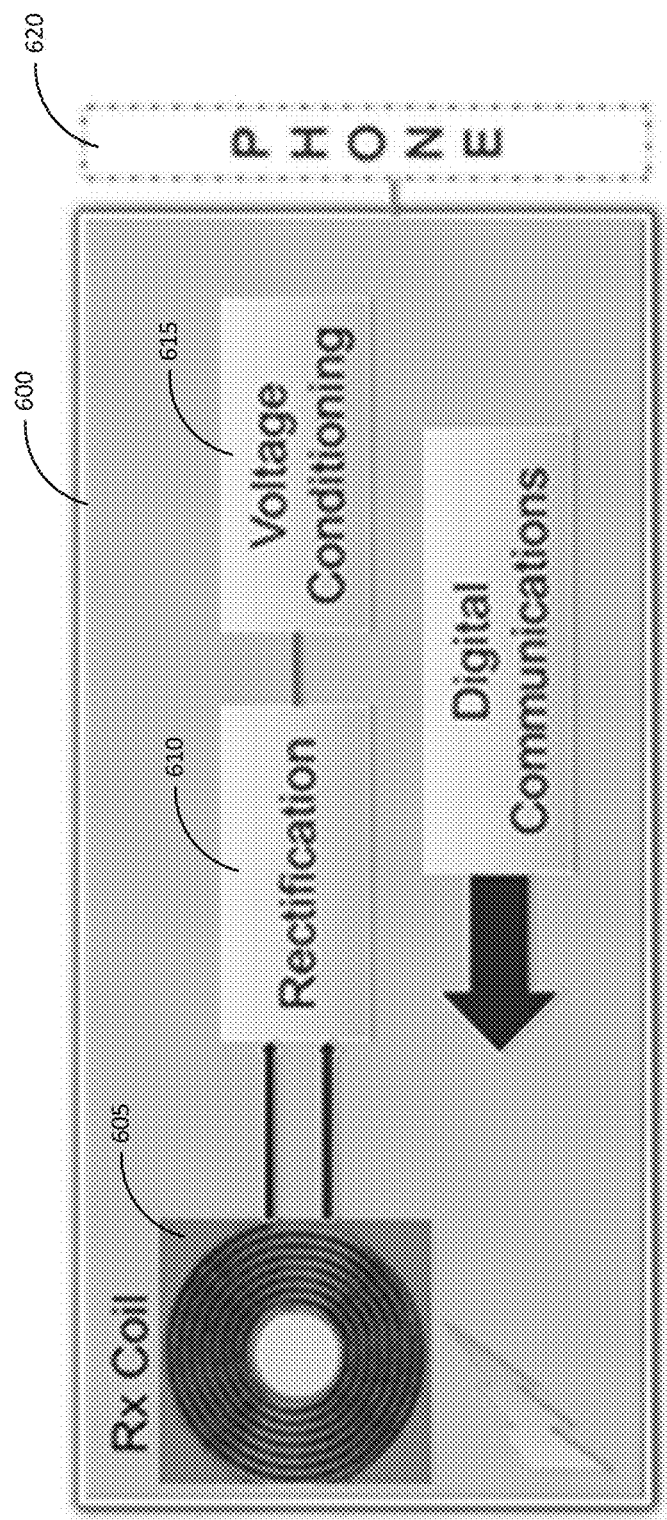
FIG. 6 is a block diagram illustrating components of a power receiver for use with a wireless charger according to one embodiment.

FIG. 6 is a block diagram illustrating components of a power receiver for use with a wireless charger according to one embodiment. In some cases, as noted above, a phone case with a receiver coil for wirelessly charging the phone may be utilized in conjunction with the wireless charger described herein. For example, the iPhone 6, iPhone 6S, or iPhone 7 and earlier phones did not include a wireless charging receiver and therefore did not support this feature. However, such a phone can be charged by a wireless charger 100 as described herein if installed in a case which includes a wireless charging receiver coil and is electrically connected to the phone's power input.

This example illustrates exemplary components of such a case. Specifically, the case 600 can include a wireless charging receiver coil 605 which can be inductively coupled with the transmission coil 140 when placed in close proximity to the wireless charger 100. The case 600 can also include one or more voltage rectifiers 610 and voltage conditioners 615. As can be understood by one skilled in the art, the voltage rectifiers 610 can control an overall voltage level produced by the receiver coil to a level that is appropriate for charging the phone while the voltage conditions can smooth and/or eliminate noise from power produced. Once rectified and conditioned, the power can be provided to the phone 620, e.g., through an electrical connector (not shown here) in the case 600 that connected with the power input of the phone 620.

As introduced above, the wireless charger 100 can comprise a customizable platform that can be adapted and integrated to several product categories. In one embodiment, the wireless charger 100 can be light-weight, thin and can be hidden and integrated inside of wallets, purses, handbags, satchels, luggage, backpacks, jackets, shirts, pants, other clothing, and accessories. When properly integrated, the wireless charger 100 according to embodiments described herein can be integrated into such apparel, accessories, or other products without altering or affecting the appearance of the product.

Figure 7:
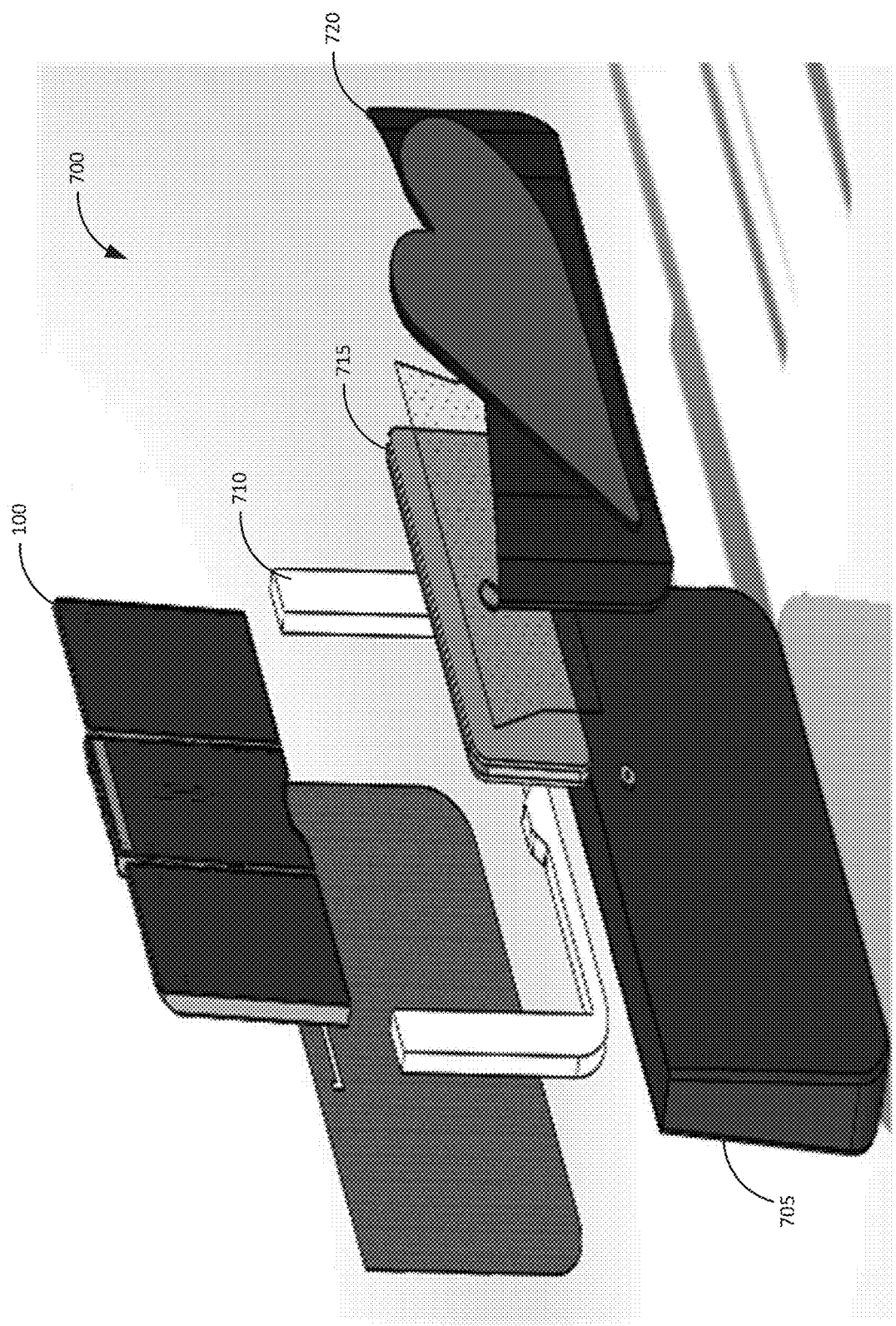
FIG. 7 is a diagram illustrating an exploded view showing a wireless charger integrated in an accessory product according to one embodiment.

FIG. 7 is a diagram illustrating an exploded view of an accessory product in which a wireless charger can be integrated according to one embodiment. More specifically, this example illustrates a pouch 700, such as a handbag or purse, into which a wireless charger 100 according to embodiments described above can be integrated. As can be seen here, the pouch 700 can include a main body 705 forming a pocket. A wireless charger 100 can be placed into this main body 705 in a position that allows the wireless charger 100 to align with a cell phone 715 when the cell phone 715 is also placed into the pouch 700. In some cases, a retainer 710 may be installed into the main body 705 of the pouch to provide a proper alignment of the wireless charger 100 and cell phone 715. The pouch 700 can further comprise a flap or cover 720 to close the pouch 700 and secure the wireless charger 100 and phone 715 in place.

It should be understood that a wide range of variations to the pouch 700 described here are possible. In other cases, wireless charger 100 can be integrated into different articles as noted above. For example, the wireless charger 100 may be integrated into a handbag, backpack, briefcase, satchel, piece of luggage, etc. In such cases, the pouch 700 illustrated here or a similar pocket for hold the wireless charger 100 and cell phone proximate to each other and in proper alignment for effective inductive coupling between the two can be integrated within the article. Similarly, such a pocket or pouch may be integrated into an article of clothing such as a jacket, sweater, vest, shirt, pair of pants, etc. Numerous other variations are contemplated and considered to be within the scope of the present invention.

As noted above, numerous variations to the shape, size, structure, etc. of the wireless charger are possible without departing from the scope of the present disclosure. For example, the wireless charger may be constructed with different proportions and/or a different shape, i.e., a different form factor, than illustrated and described above. In some cases, the wireless charger may be constructed with one portion containing one or more batteries instead of the two portions described above. Additionally or alternatively, rather than multiple portions having flexible joints between each, the wireless charger may be constructed as a single, rigid unit. Other than the physical form factor, variations can exist between the power supply and charging capacity of different embodiments of the wireless charger. For example, a larger wireless charge may accommodate more or larger batteries thereby providing a greater charging capacity. Variations can also exist in the internal electronic components and the functions they perform. These variations and others may be based on how the wireless charge will be used or integrated into another product. For example, a larger wireless charger may be useful in a product in which it will be permanently integrated or in uses where it is not likely to be changed between products frequently. A smaller wireless charger, while providing less charging capacity, provides greater portability and interchangeability between different products. Numerous other variations are contemplated and considered to be within the scope of the present invention. One alternative embodiment will now be described by way of example.

Figure 8:
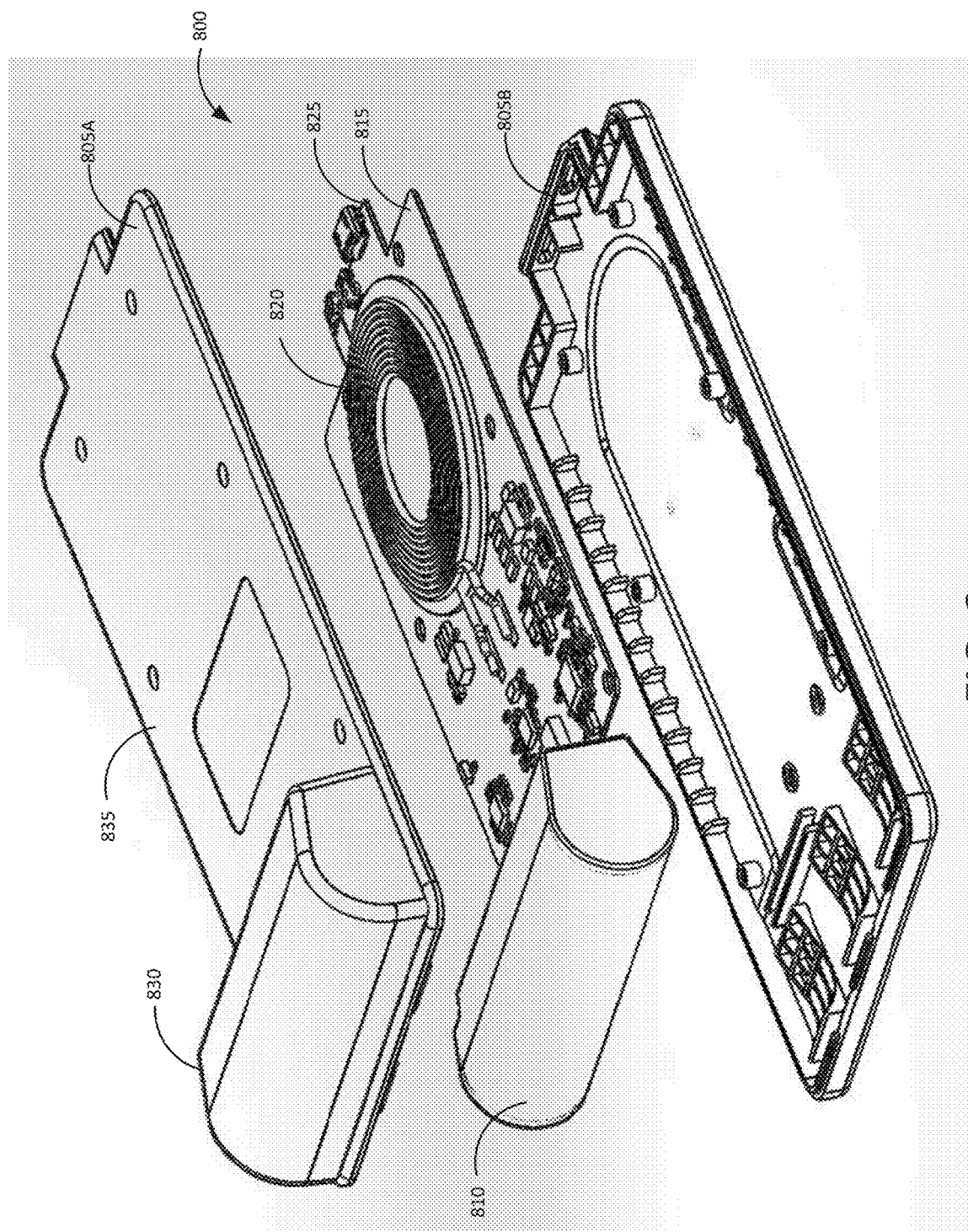
FIG. 8 is a diagram illustrating an exploded view showing the structure of a wireless charger adapted for integration into a different set of products according to an alternative embodiment.

FIG. 8 is a diagram illustrating a view of a wireless charger adapted for integration into a different set of products according to an alternative embodiment. More specifically, this example illustrates an exploded isometric view of a wireless charger 800 according to one embodiment. As illustrated here, the wireless charger 800 can comprise a hard shell or case consisting of two halves 805A and 805B which together enclose the other elements of the wireless charger 800. The wireless charger 800 can comprise a battery 810, main board 815, wireless transmitter 820 and console 825. The main board 815 can further comprise the electronic elements for controlling charging of the battery 810 and wireless charging of the phone such as will be described in greater detail below.

Of note, the wireless charger 800 here is arranged in a different form factor than the wireless charger 100 described above. Rather than the relatively flat structure of the wireless charger 100 described above and comprising flat batteries mounted inside of portions 115A and 115C of the hard shell or case that are flexible or movable relative to a central portion 115B containing the main board 215 and other components, the wireless charger 800 in this embodiment comprises a raised or rounded portion 830 of the hard shell or case to accommodate a cylindrical or similar shaped battery 810. The hard shell or case can also include a relatively flat portion 835 which, according to one embodiment, can be substantially the same size and shape as a cell phone or other device the wireless charger 800 is intended to charge. When the phone or other device is placed on this portion 835 of the wireless charger 800, the transmitter coil 820 can be in proximity and alignment with the receiver coil of the phone to provide effective inductive coupling. As will be described in greater detail below, the more compact form factor of this embodiment can provide flexibility in the products in which it is integrated and allow greater interchange ability between products.

Figure 9:
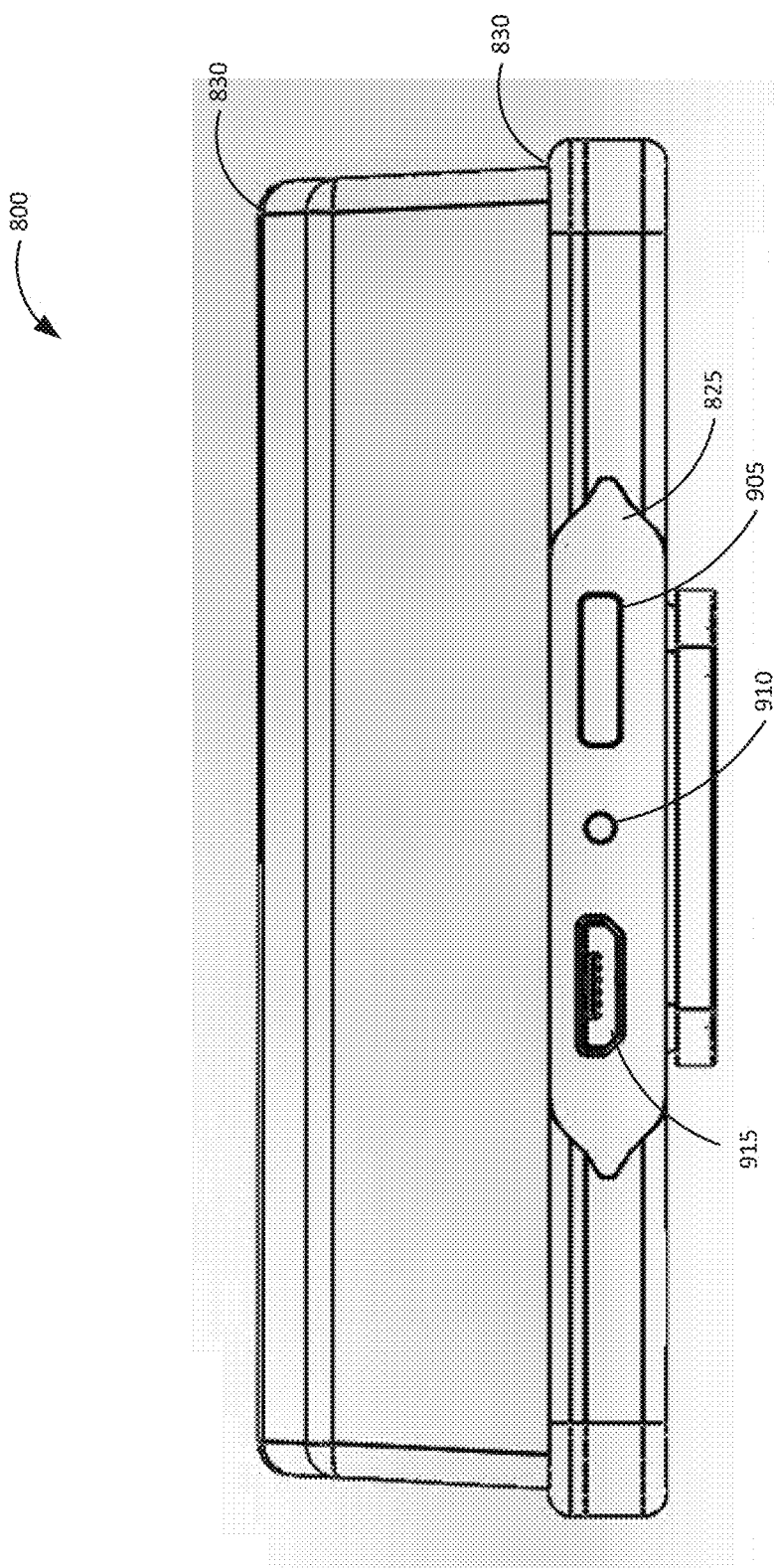
FIG. 9 is a diagram illustrating a different view and additional details of a wireless charger according to the alternative embodiment.

FIG. 9 is a diagram illustrating a different view and additional details of a wireless charger according to the alternative embodiment. More specifically, this view illustrates an end of the wireless charger 800 along the flat portion 835 of the wireless charger 800 and opposite the raised, rounded portion 830 enclosing the battery 810. As will be described below with reference to FIGS. 11A-11E, this end of the wireless charger 800 can be considered a top end from the perspective of the user when the wireless charger is installed in a product and oriented to accept a cell phone in typical usage. As can be in this view, the console 825 of the wireless charger 800 can comprise an on/off switch 905, an indicator 910 such as a multi-color LED controlled by the micro-controller and lighted to indicate status to the user, and an input power connector 915 which can comprise, for example, a Universal Serial Bus (USB) connector, mini-USB connector, or other known connector type through which the wireless charger can be connected with a wall outlet charging adapter or power supply to charge the battery of the wireless charger.

Figure 10:
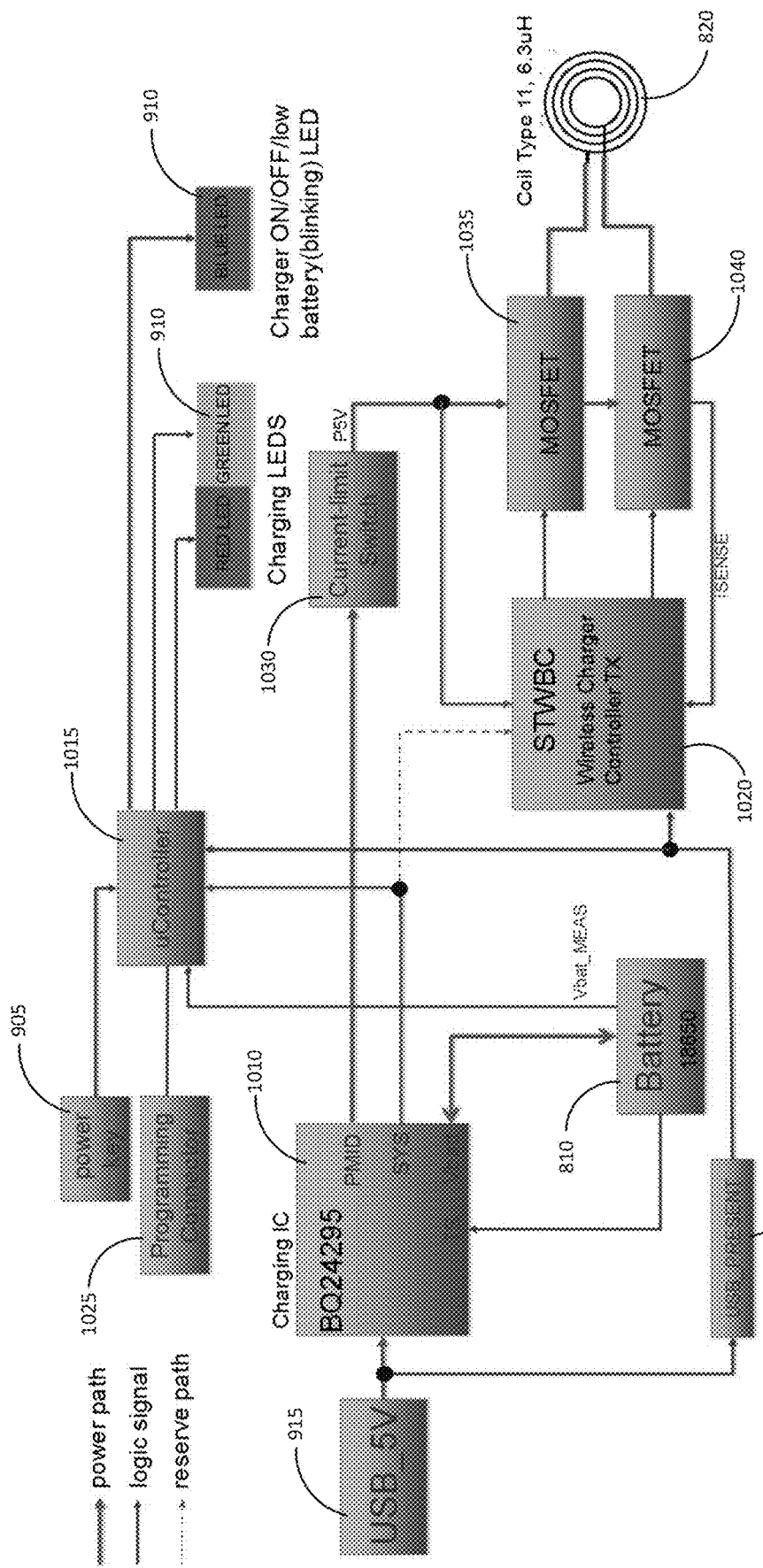
FIG. 10 is a block diagram illustrating additional details of the components of the wireless charger according to the alternative embodiment.
Figure 11C:
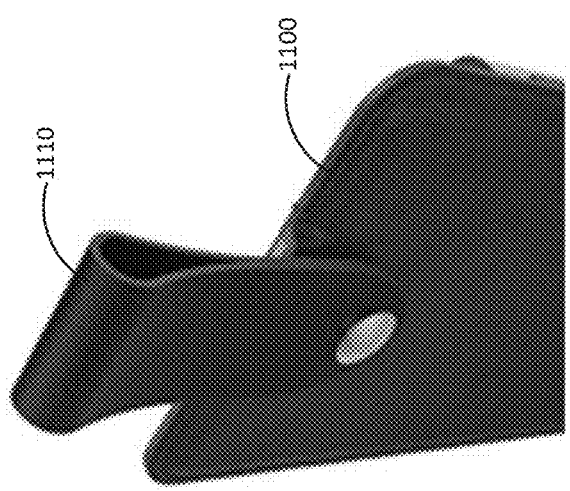
FIGS. 11C-11E illustrate additional details of an accessory product carrying a modular design for multiple attachment mechanisms and integrated with a wireless charger according to the alternative embodiment.
Figure 11D:
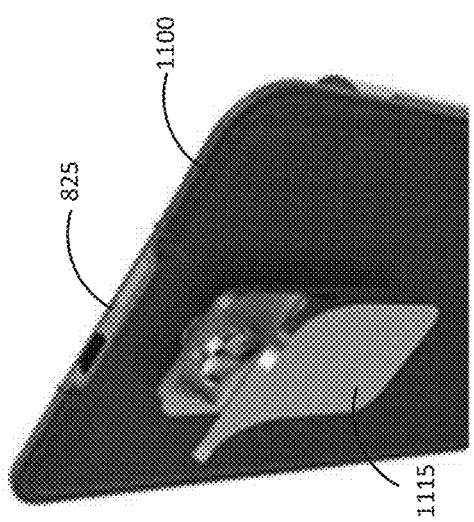
Figure 11E:
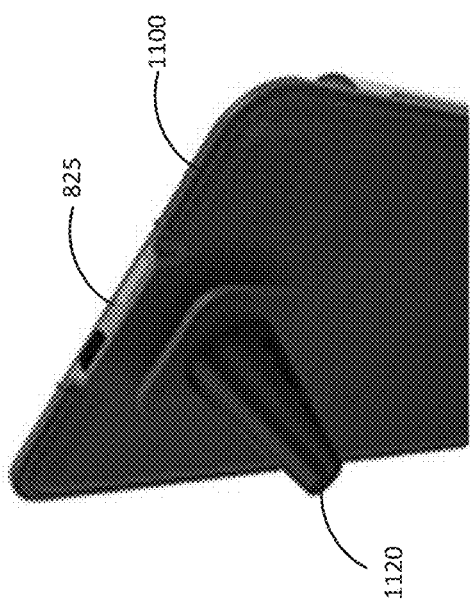

FIG. 10 is a block diagram illustrating additional details of the components of the wireless charger according to the alternative embodiment. The main board 815 of the wireless charger 800 can have mounted thereon a USB or other power input 915 used to provide power to the other components. The other components can include an input power detection component 1005 and a charging component 1010 or integrated circuit (IC). The input power detection component 1005 can, upon application of external power to the power input 915, signal other components of the wireless charter 800 such as the microcontroller 1015 and wireless charging controller 1020. The charging component 1010 or IC can comprise electronic components for conditioning and controlling the voltage and current applied to charge the battery 810. The charging component 1010 or IC can also condition and control power applied to the microcontroller 1015 and wireless transmitter 820.

The microcontroller 1015 can receive power from the charging component 1010 an inputs from the power detection component 1005, battery 810, and on/off switch 905 of the wireless charger. Based on these inputs, the microcontroller 1015 can control the indicator 910 on the console 825 of the wireless charger 800 to indicate a status of the various components. For example, the microcontroller 1015 may light red and green LEDs of the indicator 910 to indicate a charging status of the battery 810, e.g., red for charging and green for fully charged. Additionally or alternatively, the microcontroller 1015 can light a different LED of the indicator 910, such as a blue LED, to indicate whether the charger is on or off and perhaps to indicate a low battery condition, e.g., by blinking. In some cases, the wireless charger 800 can also include a programming connector 1025 comprising a wired or wireless connector through which the code or data of the microcontroller can be updated.

As illustrated here, the charging component 1010 can provide power to drive the wireless transmission coil 820. The power provided by the charging component 1010 may first pass through a current limiting switch 1030 and then be gated or switched by one or more Metal-Oxide-Semiconductor Field-Effect Transistor (MOSFETs) 1035 and 1040 under control of the wireless charging controller 1020 to drive the transmission coil 820 in a manner to create an inductive field for coupling with the phone. That is, power can be applied to the MOSFETs 1035 and 1040 which can be switched by the wireless charging controller 1020 to turn the transmission coil 820 on and off rapidly, thereby creating an inductive effect on a receiver coil of the phone or device when it is placed near to the transmission coil 820.

FIG. 11 is a schematic diagram of the charging controller 1010 of the wireless charger 800 according to the alternative embodiment. In this example, J1 is the USB connector, J2 is the battery connector, and U2 is the charging IC. The input of charging IC 1010 is USB VBUS and the output is PMID and SYS. PMID is providing 5 V to the MOSFETs 1035 and 1040 and SYS is provided to the microcontroller 1015 as a power source. The charging IC 1010 has an NTC thermistor pin to monitor the battery temperature. The PMID output enable can be controlled by microcontroller 1015.

FIG. 12 is a schematic diagram of the current limiting switch 1030 of the wireless charger 800 according to the alternative embodiment. According to one embodiment, the current-limit switch 1030 can be a backup solution for transmission coil current control if the wireless charging controller 1020 has the feature. In this example, the current can be modified by adjusting the resistor value connected to pin2 of U4.

FIG. 13 is a schematic diagram of the wireless charging controller 1020 of the wireless charger 800 according to the alternative embodiment. As illustrated in this example, the wireless charging controller 1020 can have an NTC thermistor pin to monitor the temperature of the main board 815 and to control the power transfer corresponding to the temperature.

FIG. 14 is a schematic diagram of gate driver MOSFETs 1035 and 1040 of the wireless charger 800 according to the alternative embodiment. In this example, U10, U11, U12, U13 are gate drivers and U8, U9 are MOSFETs.

FIG. 15 is a schematic diagram of the microcontroller 1015 and power switch 905 of the wireless charger 800 according to the alternative embodiment. In this example, U7 is the microcontroller 1015, SW1 is the on/off switch 905 monitored by microcontroller 1015, and U17 is a reset IC.

The wireless charger 800 of this embodiment can be implemented in a wide variety of products, e.g., accessories, clothing, etc. For example, FIG. 16A is a diagram illustrating a view of an accessory product in which a wireless charger can be integrated according to one embodiment. More specifically, this example illustrates a cell phone pouch 1600 or case into which the wireless charger 800 can be integrated. FIG. 16A illustrates a side view of the pouch 1600 or case while FIG. 16B illustrates an exploded isometric view of how the product can be integrated into soft goods or fabrics. As can be seen here, the pouch 1600 can comprise a rear or backing portion 1605A and a front or pocket portion 1605B. The wireless charger 800 can be disposed between these two portions 1605A and 1605B and within the pouch 1600. When a cell phone is placed into the pouch 1600 the cell phone will be brought into proper proximity and alignment with the wireless charger 1600 for effective inductive coupled with the wireless charger 800.

FIGS. 16C-16E illustrate additional details of an accessory product integrated with a wireless charger according to the alternative embodiment. The accessory product carries a modular design for multiple attachment mechanisms.

More specifically, FIG. 16C illustrates the pouch 1600 as described above with an attached loop 1610 for attachment in accessory products. FIG. 16D illustrates the pouch 1600 as described above with a clip 1615 for attachment in accessory or apparel products. Also visible in this view is the console 825 of the wireless charger 800 within the pouch 1600. FIG. 16D illustrates the pouch 1600 as described above with a car vent clip 1620 attachment for automotive aftermarket products. Using these and other attachment mechanisms, the pouch 1600 may be integrated into an accessory such as a purse, handbag, backpack, briefcase, satchel, piece of luggage, etc., an article of clothing such as a jacket, sweater, vest, shirt, pair of pants, etc., or a variety of other products of different types. Numerous other variations are contemplated and considered to be within the scope of the present invention.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A wireless charger for wirelessly charging an electronic device, the wireless charger comprising:
   an inductive charging transmission coil;
   one or more batteries connected with and providing electrical power to the inductive charging transmission coil;
   a power input connector receiving electrical power from an external source;
   a controller or a power management component controlling charging of the one or more batteries by the electrical power from the external source received through the power input connector and charging of the electronic device through the inductive charging transmission coil when the electronic device is proximate to and aligned with the wireless charger; and
   a first rigid case portion enclosing the one or more batteries;
   a second rigid case portion enclosing the inductive charging transmission coil, power input connector, and controller;
   a flex circuit between the first rigid case portion and the second rigid case portion providing electrical connection between the one or more batteries and the inductive charging transmission coil, power input connector, and controller and allowing the first rigid case portion to pivot relative to the second rigid case portion, wherein the wireless charger is operable regardless of the position or orientation of the first and second rigid case portions; and
   a console disposed on an edge of the second rigid case portion and comprising a switch turning the wireless charger on and off and a single, multi-color Light Emitting Diode (LED) indicating a state of the wireless charger, wherein the input power connector is disposed in the console.

2. The wireless charger of claim 1, wherein the controller further comprises:
   a digital power controller connected with the inductive charging transmission coil and driving the inductive charging transmission coil to create an inductive field; and
   a power management component conditioning and controlling voltage and current received through the input power connector and applied to the batteries and the digital power controller.

3. The wireless charger of claim 2, further comprising one or more temperature sensors and wherein the digital power controller and power management component control operation of the wireless controller based on input from the one or more temperature sensors.

4. The wireless charger of claim 2, further comprising one or more current limit sensors and wherein the digital power controller and power management component control operation of the wireless controller based on input from the one or more current limit sensors.

5. The wireless charger of claim 1, wherein the power input connector comprises a Universal Serial Bus (USB) connector.

6. The wireless charger of claim 1, wherein the one or more batteries comprise rechargeable lithium ion or lithium polymer batteries.

* * * * *